(12) United States Patent
Toba et al.

(10) Patent No.: US 11,414,041 B2
(45) Date of Patent: Aug. 16, 2022

(54) VEHICLE SEAT

(71) Applicant: NHK SPRING CO., LTD., Yokohama (JP)

(72) Inventors: Hitoshi Toba, Yokohama (JP); Kazuhito Kashima, Yokohama (JP); Kensuke Yoshiga, Yokohama (JP); Yukinori Mikita, Yokohama (JP); Shota Nakajima, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 143 days.

(21) Appl. No.: 17/068,196

(22) Filed: Oct. 12, 2020

(65) Prior Publication Data

US 2021/0107428 A1    Apr. 15, 2021

(30) Foreign Application Priority Data

Oct. 15, 2019    (JP) .............................. JP2019-188888

(51) Int. Cl.
*B60R 21/231* (2011.01)
*B60R 21/233* (2006.01)

(52) U.S. Cl.
CPC .................. *B60R 21/23138* (2013.01); *B60R 2021/23146* (2013.01); *B60R 2021/23324* (2013.01)

(58) Field of Classification Search
CPC .... B60R 21/23138; B60R 2021/23146; B60R 21/2176; B60R 21/207
See application file for complete search history.

(56) References Cited

U.S. PATENT DOCUMENTS

2017/0259770 A1*  9/2017  Fujiwara ............. B60R 21/0134
2019/0001914 A1*  1/2019  Yaegashi ............... B60R 21/207

FOREIGN PATENT DOCUMENTS

| DE | 102014211748 A1 | * | 12/2014 | ......... B60R 21/207 |
| DE | 102020109062 A1 | * | 10/2021 | ......... B60R 21/207 |
| EP | 1820702 A1 | * | 8/2007 | ......... B60R 21/207 |
| JP | 11129856 A | * | 5/1999 | ......... B60R 21/237 |
| JP | 4452598 B2 | | 4/2010 | |
| JP | 2017030510 A | * | 2/2017 | ......... B60R 21/207 |

* cited by examiner

*Primary Examiner* — Karen Beck
(74) *Attorney, Agent, or Firm* — Knobbe, Martens, Olson & Bear, LLP

(57) ABSTRACT

A vehicle seat including: an outside cover; an inside cover; a side airbag module; a side frame; an outside reinforcement cloth that covers a seat width direction outer side of the side airbag module; and an inside reinforcement cloth that is disposed between the side frame and the side airbag module, that covers a seat width direction inner side of the side airbag module, that includes one seat front-rear direction end portion separated into seat upper and lower sides and fixed to the side frame in a manner that avoids the fixing portion, that includes another seat front-rear direction end portion joined to the inside cover at the join portion, and that is configured to transmit tension to the join portion during inflation and deployment of the side airbag.

6 Claims, 12 Drawing Sheets

VEHICLE SEAT

CROSS-REFERENCE TO RELATED APPLICATION

This application is based on and claims priority under 35 USC 119 from Japanese Patent Application No. 2019-188888 filed on Oct. 15, 2019, the disclosure of which is incorporated by reference herein.

BACKGROUND

Technical Field

The present disclosure relates to a vehicle seat.

Related Art

For example, Japanese Patent No. 4452598 discloses technology relating to a vehicle seat provided with a side airbag. In this related art, a reinforcement cloth is employed to stabilize an inflation direction of the side airbag. This reinforcement cloth is configured by a sheet shaped front face-side reinforcement cloth that covers a front face side and an inner side face disposed on a seat width direction inner side of an airbag unit, and a sheet shaped side face-side reinforcement cloth that covers an outer side face disposed on a seat width direction outer side of the airbag unit.

The front face-side reinforcement cloth is attached to a front face-side reinforcement cloth bracket, and the side face-side reinforcement cloth is attached to a side face-side reinforcement cloth bracket. A pair of screws are provided spaced apart in the up-down direction on the inner side face of the airbag unit, and an airbag bracket is fixed to the airbag unit in a state in which one seat front-rear direction end side of the front face-side reinforcement cloth is disposed between the pair of screws.

The airbag bracket is formed with an L-shaped cross-section profile as sectioned along a horizontal direction, and one side of the airbag bracket is fixed to the airbag unit. The front face-side reinforcement cloth bracket and the side face-side reinforcement cloth bracket are attached to the other side of the airbag bracket, and in this state, the other side of the airbag bracket is fixed to a side frame provided to a side section of a seatback frame configuring a framework of a seatback configuring a back section of the vehicle seat.

However, in Japanese Patent No. 4452598, one seat front-rear direction end side of the front face-side reinforcement cloth (referred to hereafter as the "inside reinforcement cloth") is pinched between the airbag bracket and the airbag unit (referred to hereafter as the "side airbag module"), and the airbag bracket fixed to the side airbag module is fixed to the vehicle seat side frame in this state. This creates difficulty in attaching the front face-side reinforcement cloth and the side face-side reinforcement cloth (referred to hereafter as the "outside reinforcement cloth") after the side airbag module has been fixed to the vehicle seat side frame.

SUMMARY

In consideration of the above circumstances, an object of the present disclosure is to obtain a vehicle seat that enables an inside reinforcement cloth and an outside reinforcement cloth to be attached even after a side airbag module has been fixed to a side frame.

A vehicle seat of a first aspect of the present disclosure includes: an outside cover that covers a seat width direction outer side surface of a seatback side section positioned on a seat width direction outer side of a seatback; an inside cover that covers a seat width direction inner side surface of the seatback side section and that includes one seat width direction end portion joined to one seat width direction end portion of the outside cover at a join portion; a side airbag module that is housed inside the seatback side section and that includes a side airbag configured to inflate and deploy toward the join portion on receiving a supply of gas; a side frame that extends in a seat up-down direction along the seatback side section with the side airbag module fixed to the side frame at a fixing portion; an outside reinforcement cloth that covers a seat width direction outer side of the side airbag module, that includes one seat front-rear direction end portion fixed to the side frame, that includes another seat front-rear direction end portion joined to the outside cover at the join portion, and that is configured to transmit tension to the join portion during inflation and deployment of the side airbag; and an inside reinforcement cloth that is disposed between the side frame and the side airbag module, that covers a seat width direction inner side of the side airbag module, that includes one seat front-rear direction end portion separated into seat upper and lower sides so as to be fixed to the side frame in a manner that avoids the fixing portion, that includes another seat front-rear direction end portion joined to the inside cover at the join portion, and that is configured to transmit tension to the join portion during inflation and deployment of the side airbag.

In the vehicle seat of the first aspect of the present disclosure, the seat width direction outer side surface of the side section positioned at the seat width direction outer side of the seatback is covered by the outside cover, and the seat width direction inner side surface of the side section is covered by the inside cover. The one seat width direction end portion of the inside cover is joined to the one seat width direction end portion of the outside cover at the join portion.

The side airbag module is housed inside the seatback side section. The side airbag module includes the side airbag configured to inflate and deploy toward the join portion on receiving a supply of gas. The side frame is provided to the seatback side section. The side frame extends along the seat up-down direction, and the side airbag module is fixed to the side frame.

The seat width direction outer side of the side airbag module is covered by the outside reinforcement cloth. The one seat front-rear direction end portion of the outside reinforcement cloth is fixed to the side frame, and the other seat front-rear direction end portion of the outside reinforcement cloth is joined to the outside cover at the join portion where the inside cover and the outside cover are joined together.

The inside reinforcement cloth is disposed between the side frame and the side airbag module, and the seat width direction inner side of the side airbag module is covered by the inside reinforcement cloth. The one seat front-rear direction end portion of the inside reinforcement cloth is separated into seat upper and lower sides and is fixed to the side frame in a manner that avoids the fixing portion where the side airbag module is fixed to the side frame. The other seat front-rear direction end portion of the inside reinforcement cloth is joined to the inside cover at the join portion.

Due to the above configuration, in the present disclosure, when the side airbag inflates and deploys on receiving a supply of gas, the outside reinforcement cloth and the inside reinforcement cloth are stretched under inflation pressure from the side airbag such that tension is transmitted to the join portion between the inside cover to which the inside reinforcement cloth is joined and the outside cover to which the outside reinforcement cloth is joined. Accordingly, tensile stress concentrates at the join portion, causing the join portion to split open such that the side airbag inflates and deploys toward the seat front-rear direction front side of the vehicle seat.

Note that in the present disclosure, as described above, the one seat front-rear direction end portion of the inside reinforcement cloth is separated into seat upper and lower sides and is fixed to the side frame in a manner that avoids the fixing portion of the side airbag module. Thus, the present disclosure enables the inside reinforcement cloth to be fixed to the side frame after the side airbag module has been fixed to the side frame.

Namely, in the present exemplary disclosure, the inside reinforcement cloth can be fixed to the side frame before fixing the side airbag module to the side frame, and the inside reinforcement cloth can also be fixed to the side frame after the side airbag module has been fixed to the side frame.

In the present disclosure, "joining" encompasses stitching, welding, bonding, and the like. Moreover, in the present disclosure, the one seat front-rear direction end portion of the inside reinforcement cloth being "separated into seat upper and lower sides" encompasses for example cases in which the one seat front-rear direction end portion of the inside reinforcement cloth branches into seat upper and lower sides to form a two-pronged profile with respect to the other seat front-rear direction end portion of the inside reinforcement cloth, as well as cases in which the inside reinforcement cloth is divided into seat upper and lower sides.

A vehicle seat of a second aspect of the present disclosure is the vehicle seat of the first aspect, wherein the one seat front-rear direction end portion of the outside reinforcement cloth and the one seat front-rear direction end portion of the inside reinforcement cloth are jointly fixed to the side frame using a resin clip.

In the vehicle seat of the second aspect of the present disclosure, the one seat front-rear direction end portion of the outside reinforcement cloth and the one seat front-rear direction end portion of the inside reinforcement cloth are jointly fixed to the side frame using the resin clip. This facilitates the attachment operation and also enables a reduction in weight in comparison to cases in which the outside reinforcement cloth and the inside reinforcement cloth are fixed to the side frame using metal nuts and bolts.

A vehicle seat of a third aspect of the present disclosure is the vehicle seat of the first or the second aspect, wherein the side frame is provided with a recess forming a gap of at least a thickness of the inside reinforcement cloth between the side airbag module and the side frame in a state in which the side airbag module has been fixed to the side frame.

In the vehicle seat of the third aspect of the present disclosure, the recess is provided to the side frame. The recess forms the gap that has at least the thickness of the inside reinforcement cloth between the side airbag module and the side frame in a state in which the side airbag module has been fixed to the side frame. Namely, in the state in which the side airbag module has been fixed to the side frame, the inside reinforcement cloth can be disposed between the side frame and the side airbag module.

A vehicle seat of a fourth aspect of the present disclosure is the vehicle seat of any one of the first to the third aspects, further including: a notch that is formed in the one seat front-rear direction end portion of the inside reinforcement cloth so as to avoid the fixing portion where the side airbag module is fixed to the side frame; and a grippable grip portion that is provided at the one seat front-rear direction end portion of the outside reinforcement cloth so as to be disposed inside the notch in a state in which the one seat front-rear direction end portion of the outside reinforcement cloth has been superimposed on the one seat front-rear direction end portion of the inside reinforcement cloth.

In the vehicle seat of the fourth aspect of the present disclosure, the notch is formed in the one seat front-rear direction end portion of the inside reinforcement cloth, and the fixing portion of the side airbag module is avoided using this notch. The grippable grip portion is provided to the one seat front-rear direction end portion of the outside reinforcement cloth. The grip portion is set so as to be disposed inside the notch in the inside reinforcement cloth in a state in which the one seat front-rear direction end portion of the outside reinforcement cloth has been superimposed on the one seat front-rear direction end portion of the inside reinforcement cloth. Accordingly, the seat up-down direction positions of the inside reinforcement cloth and the outside reinforcement cloth with respect to the side frame are easier to ascertain.

A vehicle seat of a fifth aspect of the present disclosure is the vehicle seat of any one of the first to the fourth aspects, wherein the one seat front-rear direction end portion of the inside reinforcement cloth and the one seat front-rear direction end portion of the outside reinforcement cloth are respectively provided with a hook capable of being anchored to the side frame.

In the vehicle seat of the fifth aspect of the present disclosure, the one seat front-rear direction end portion of the inside reinforcement cloth and the one seat front-rear direction end portion of the outside reinforcement cloth are respectively provided with the hooks, and the hooks are capable of being anchored to the side frame. Providing the respective hooks to the inside reinforcement cloth and the outside reinforcement cloth in this manner enables the inside reinforcement cloth and the outside reinforcement cloth to be provisionally held by anchoring the respective hooks to the side frame during fixing of the inside reinforcement cloth and the outside reinforcement cloth to the side frame, thereby improving ease of operation.

As described above, the vehicle seat of the first aspect of the present disclosure enables the inside reinforcement cloth and the outside reinforcement cloth to be attached even after the side airbag module has been fixed to the side frame.

The vehicle seat of the second aspect of the present disclosure enables a reduction in costs in comparison to cases in which the outside reinforcement cloth and the inside reinforcement cloth are fixed to the side frame using metal nuts and bolts.

The vehicle seat of the third aspect of the present disclosure enables the inside reinforcement cloth to be fixed to the side frame even after the side airbag module has been fixed to the side frame.

The vehicle seat of the fourth aspect of the present disclosure enables the ease of operation to be improved when fixing the inside reinforcement cloth and the outside reinforcement cloth to the side frame.

The vehicle seat of the fifth aspect of the present disclosure enables the ease of operation to be improved when fixing the inside reinforcement cloth and the outside reinforcement cloth to the side frame.

BRIEF DESCRIPTION OF THE DRAWINGS

Exemplary embodiments of the present disclosure will be described in detail based on the following figures, wherein.

DETAILED DESCRIPTION

Figure 1:
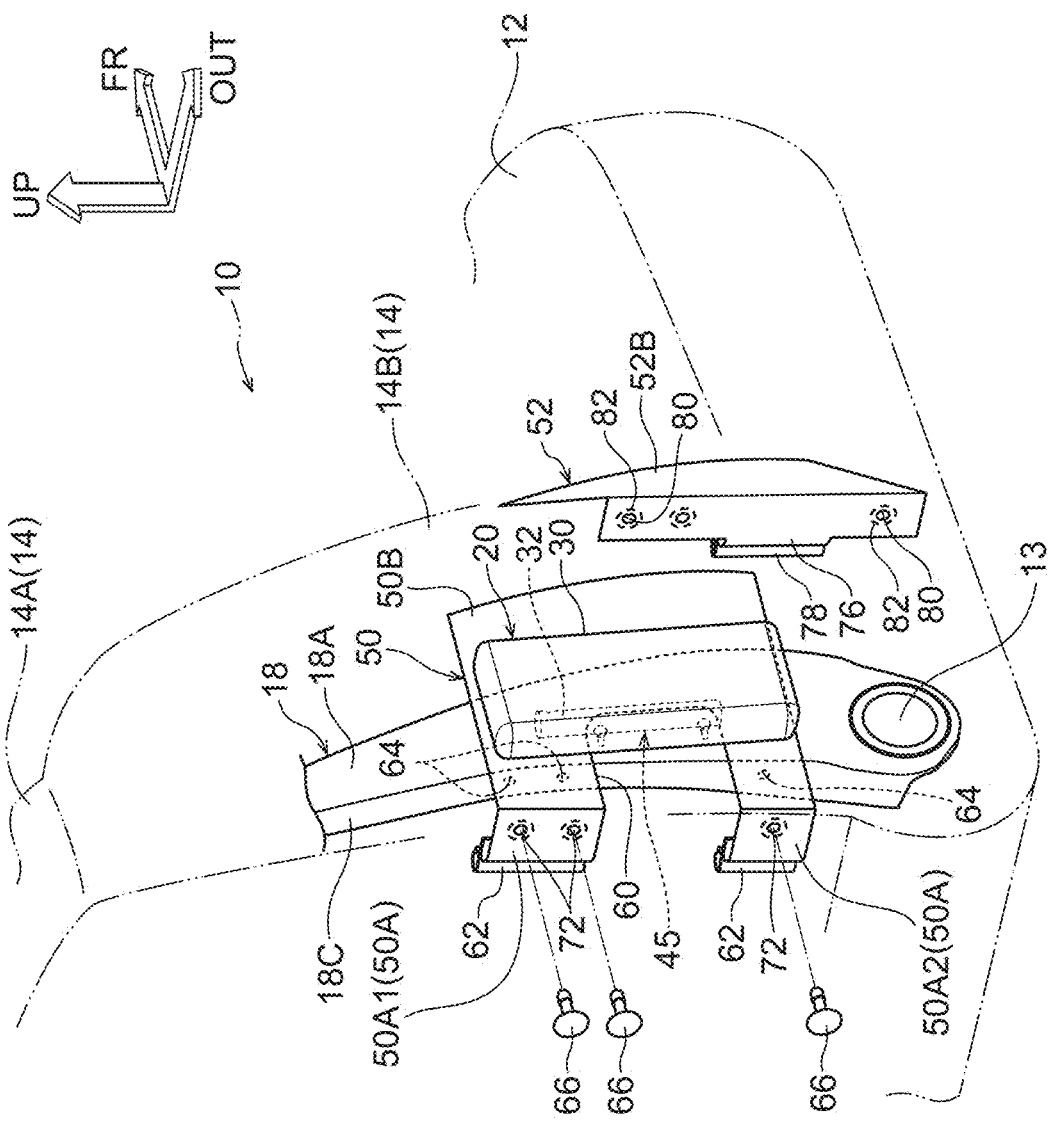
FIG. 1 is a perspective view illustrating a vehicle width direction outer side of a vehicle seat according to an exemplary embodiment as viewed from obliquely from the rear.

Explanation follows regarding a vehicle seat according to an exemplary embodiment of the present disclosure, with reference to the drawings. Note that in the drawings, the arrow FR indicates a front side of the vehicle seat, the arrow UP indicates an upper side of the vehicle seat, and the arrow OUT indicates an outer side of the vehicle seat, as appropriate. Unless specifically stated otherwise, reference to front and rear, upward and downward, and left and right directions refers to front and rear in a front-rear direction of the vehicle seat, upward and downward in an up-down direction of the vehicle seat, and left and right in a left-right direction (seat width direction) of the vehicle seat.

Vehicle Seat Configuration

First, explanation follows regarding configuration of the vehicle seat according to the present exemplary embodiment.

Vehicle Seat

FIG. 1 illustrates a vehicle seat 10 according to the present exemplary embodiment. For example, the vehicle seat 10 configures a driver's seat, and includes a seat cushion 12 on which an occupant sits, a seatback 14 to support the back of the occupant, and a headrest (not illustrated in the drawings) to support the head of the occupant. The seatback 14 is provided so as to be capable of swinging about a shaft 13 disposed along the seat width direction at a seat front-rear direction rear end portion of the seat cushion 12, and the headrest is provided at a seat up-down direction upper end of the seatback 14.

The seatback 14 includes a seatback body 14A disposed at a seat width direction central portion, and seatback side portions (side sections) 14B provided integrally to both seat width direction outer side end portions of the seatback body 14A.

The seatback side portions 14B respectively protrude toward the seat front-rear direction front side, and are formed such that a protrusion amount thereof decreases on progression from the seat width direction outer side toward the seatback body 14A. A non-illustrated vehicle side door is disposed at the seat width direction outer side of the seatback side portion 14B that, out of the left and right seatback side portions 14B, is disposed on a vehicle width direction outer side.

Figure 2:
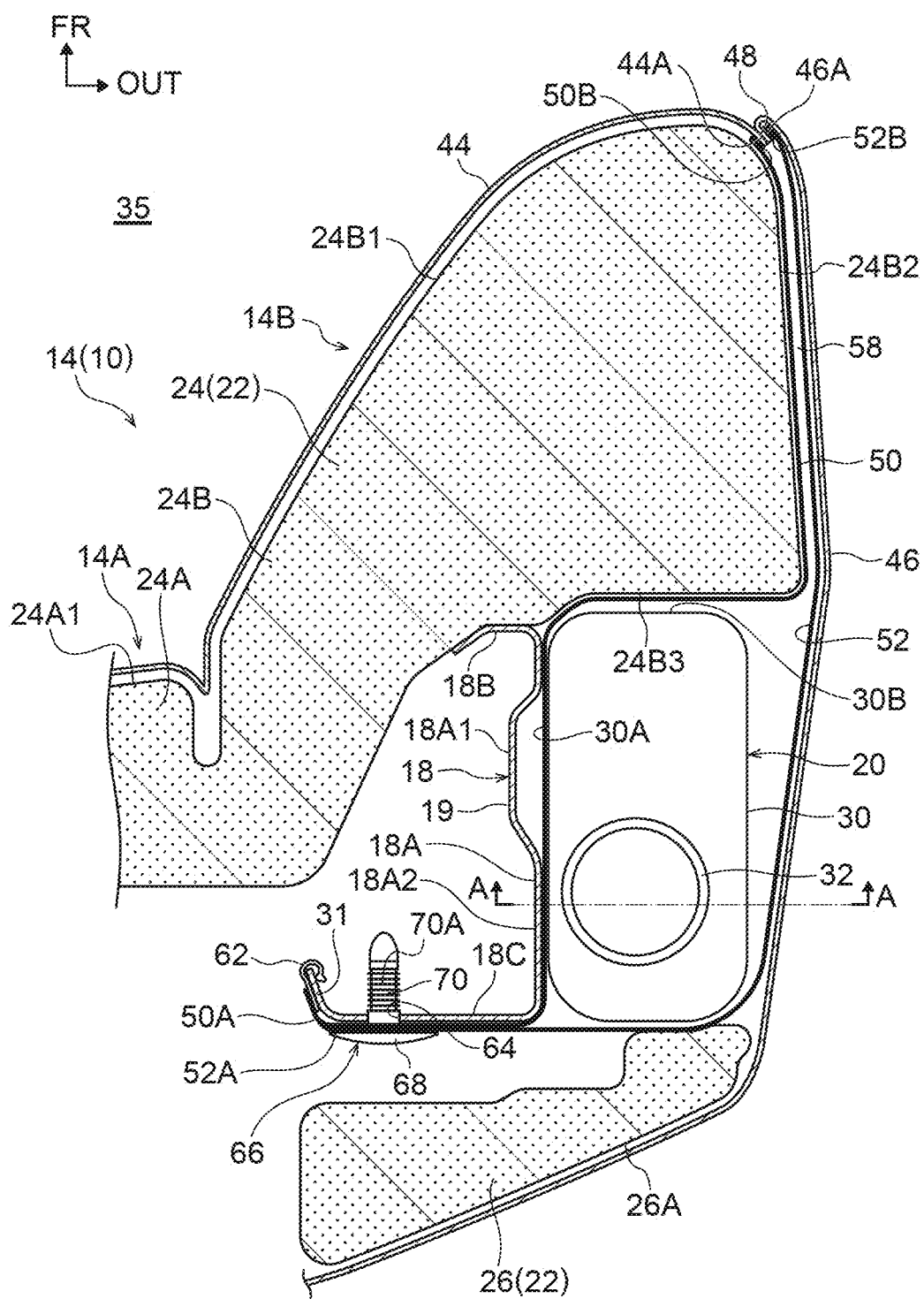
FIG. 2 is a cross-section sectioned along a substantially horizontal direction illustrating a seatback side portion side of a vehicle seat according to an exemplary embodiment.

FIG. 2 is a cross-section illustrating the seatback side portion 14B disposed on the seat width direction outer side of the seatback 14, in a state sectioned along a substantially horizontal direction. As illustrated in FIG. 2, a seatback side frame (referred to hereafter as the "side frame") 18 is provided extending in the seat up-down direction inside the seatback side portion 14B so as to follow the seatback side portion 14B.

Side Frame

In the present exemplary embodiment, the side frame 18 has a substantially back-to-front C-shaped cross-section profile opening toward the seat width direction inner side as sectioned along the horizontal direction. Note that although not illustrated in the drawings, out of the left and right seatback side portions 14B, the cross-section profile of the side frame 18 in the seatback side portion 14B disposed on the vehicle width direction inner side is configured in a substantially C-shape.

The side frame 18 includes an outside wall 18A extending along the seat front-rear direction, a front side wall 18B bent toward the seat width direction inner side from a seat front-rear direction front end of the outside wall 18A, and a rear side wall 18C bent toward the seat width direction inner side from a seat front-rear direction rear end of the outside wall 18A.

A recess 19 that is recessed toward the seat width direction inner side is formed to a front portion 18A1 side including a seat front-rear direction central portion of the outside wall 18A of the side frame 18. A side airbag module (referred to hereafter as the "airbag module") 20, described later, is assembled to a seat front-rear direction rear portion 18A2 side of the outside wall 18A of the side frame 18.

A seatback pad 22 formed from a shock-absorbent member configured from foamed urethane or the like is provided at a seat front-rear direction front side and rear side of the side frame 18, including at the seat width direction inner side of the side frame 18.

Seatback Pad

In the present exemplary embodiment, the seatback pad 22 is configured including a pad front portion 24 provided at a front portion side of the seatback 14, and a pad rear portion 26 provided at a rear portion side of the seatback 14. The pad front portion 24 is configured including a pad body 24A provided to the seatback body 14A so as to span across the seatback body 14A between the left and right seatback side portions 14B, and pad side portions 24B provided to the left and right seatback side portions 14B.

Namely, the pad body 24A gives the seatback body 14A of the seatback 14 its shape, and each of the pad side portions 24B gives the corresponding seatback side portion 14B of the seatback 14 its shape. Accordingly, the pad side portion 24B is thicker than the pad body 24A, and protrudes toward the seat front-rear direction front side.

Note that the pad rear portion 26 is provided further toward the seat front-rear direction rear side than the side frame 18.

Side Airbag Module

In the present exemplary embodiment, the airbag module 20 is disposed running in the seat width direction at the outside of the side frame 18, and at the seat front-rear direction rear side of the pad side portion 24B disposed in the seatback side portion 14B on the vehicle width direction outer side out of the left and right seatback side portions 14B.

The airbag module 20 includes a housing case 30, a side airbag (not illustrated in the drawings) housed inside the housing case 30 in a folded state, and an inflator 32, serving as a gas supply unit to supply gas into the side airbag housed inside the housing case 30. The side airbag is formed in a bag shape from cloth, a resin sheet, or the like, and is configured to deploy into a vehicle cabin interior 35 while inflating on receiving a supply of gas from the inflator 32.

Figure 3:
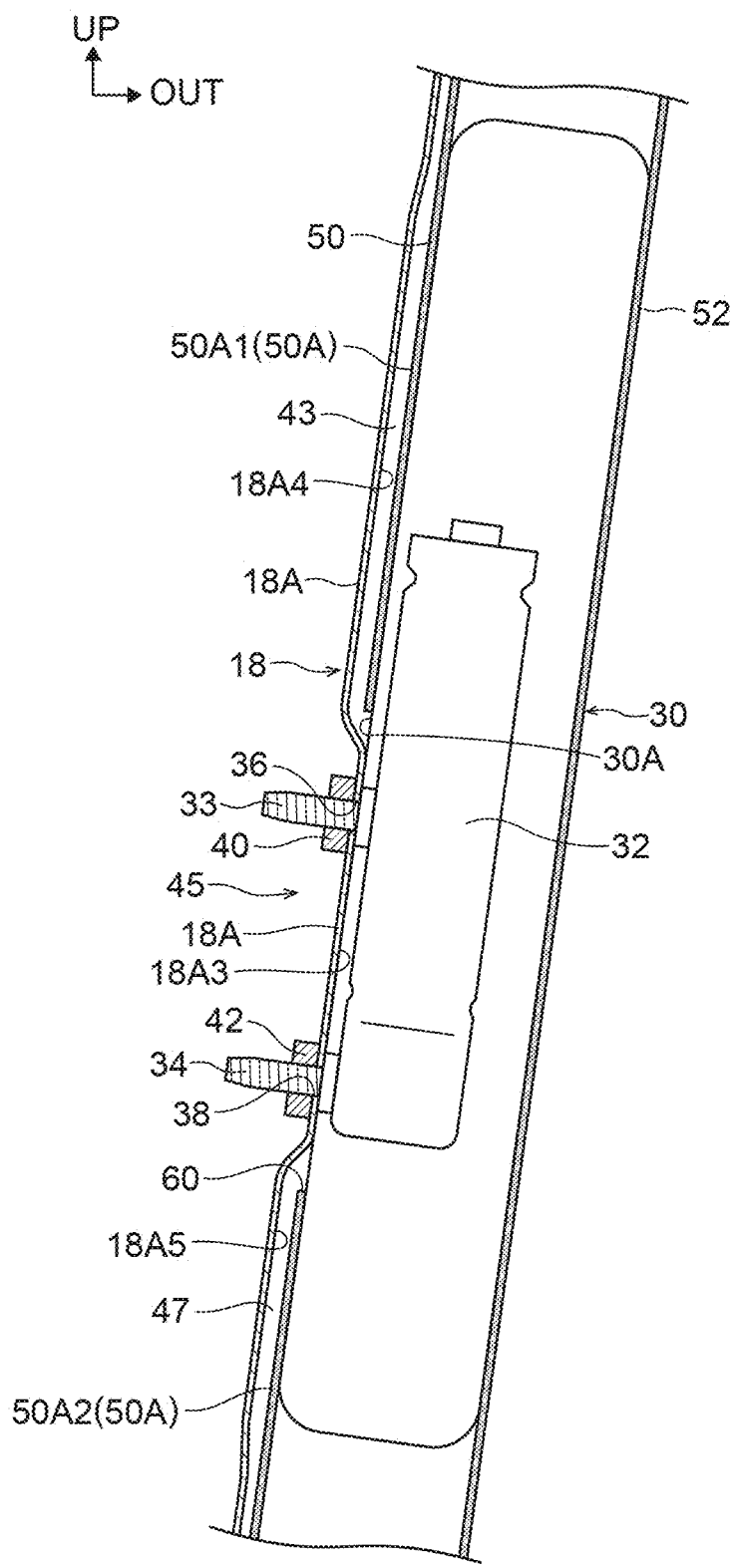
FIG. 3 is a cross-section sectioned along line A-A in FIG. 2.

FIG. 3 is a cross-section sectioned along line A-A in FIG. 2. As illustrated in FIG. 3, in the housing case 30, a pair of stud bolts 33, 34 that are spaced apart in the seat up-down direction are provided arrayed in the length direction of the inflator 32 (in the seat up-down direction) on an inside face 30A at the seat width direction inner side of the housing case 30.

Side Frame, Airbag Module

As illustrated in FIG. 3, in the present exemplary embodiment, the outside wall 18A of the side frame 18 is provided with an attachment mount 18A3 to which the inflator 32 is attached. The attachment mount 18A3 projects toward the seat width direction outer side, and a pair of through holes 36, 38 are formed through the attachment mount 18A3 so as to be arrayed in the seat up-down direction.

The stud bolts 33, 34 are inserted through the respective through holes 36, 38, and nuts 40, 42 are fastened to the stud bolts 33, 34 inserted through the respective through holes 36, 38. Namely, the airbag module 20 is fixed to the outside wall 18A of the side frame 18 by the stud bolts 33, 34 and the nuts 40, 42 (configuring a fixing portion 45).

In this manner, the inside face 30A of the housing case 30 abuts the attachment mount 18A3 in a state in which the airbag module 20 has been fixed to the side frame 18. As described above, the attachment mount 18A3 is formed to the outside wall 18A of the side frame 18 so as to project toward the seat width direction outer side. Accordingly, when the attachment mount 18A3 is taken as a reference, recesses toward the seat width direction inner side (an upper side recess 18A4, a lower side recess 18A5) are formed at the upper side and lower side of the attachment mount 18A3 respectively.

Accordingly, in the present exemplary embodiment, in a state in which the airbag module 20 has been fixed to the side frame 18, and the inside face 30A of the housing case 30 is abutting the attachment mount 18A3 of the side frame 18, a gap 43 is formed between the inside face 30A of the housing case 30 and the upper side recess 18A4 of the side frame 18, and a gap 47 is formed between the inside face 30A of the housing case 30 and the lower side recess 18A5 of the side frame 18.

Inside Cover, Outside Cover

As illustrated in FIG. 2, in the present exemplary embodiment, the pad front portion 24 is provided further toward the seat width direction inner side than the side frame 18, and further toward the seat front-rear direction front side than the airbag module 20 as well as the side frame 18.

A front face (seat width direction inner side surface of the side frame 18) 24B1 each of the pad side portions 24B and a front face 24A1 of the pad body 24A of the pad front portion 24 are covered by an inside cover 44.

An outer face (seat width direction outer side surface of the side frame 18) 24B2 of the pad side portion 24B, a seat width direction outer side of the airbag module 20, and a rear face 26A of the pad rear portion 26 are covered by an outside cover 46.

Figure 4:
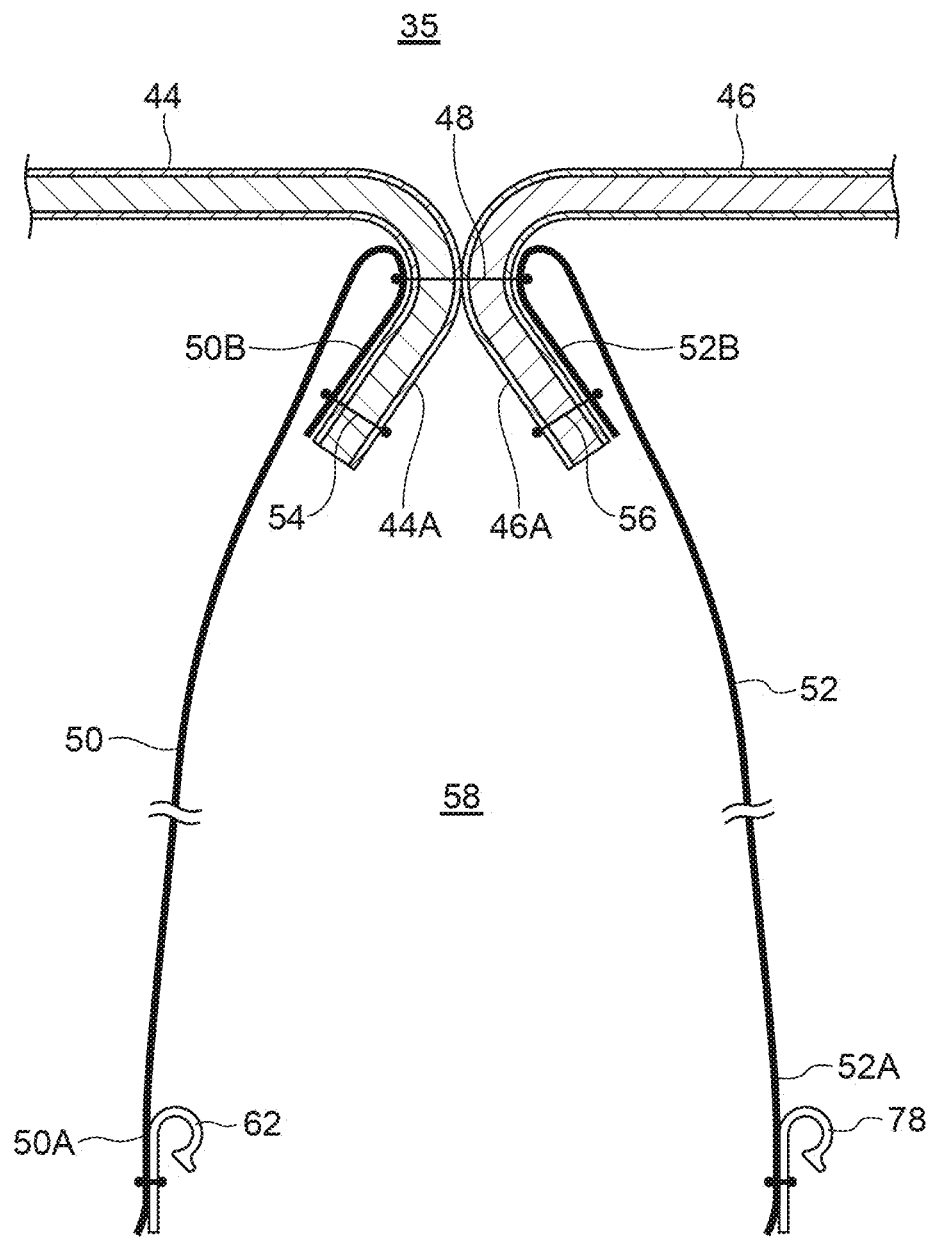
FIG. 4 is an enlarged diagram illustrating a join portion between an inside cover, an outside cover, an inside reinforcement cloth, and an outside reinforcement cloth applied to a vehicle seat according to an exemplary embodiment.

As illustrated in FIG. 4, one seat width direction end portion 44A of the inside cover 44 (referred to hereafter simply as the "one end portion 44A of the inside cover 44") and one seat width direction end portion 46A of the outside cover 46 (referred to hereafter simply as the "one end portion 46A of the outside cover 46") are folded back and joined to one another (configuring a join portion 48). The join portion 48 is disposed on the outer face 24B2 of the corresponding pad side portion 24B so as to be toward the side of the front face 24B1 of the pad side portion 24B.

FIG. 4 is an enlarged view illustrating the join portion 48 where the inside cover 44, the outside cover 46, and an inside reinforcement cloth 50 and an outside reinforcement cloth 52, described below, are joined together. In the present exemplary embodiment, "joining" encompasses stitching, welding, bonding, and the like. This also applies to joining other than at the join portion 48.

Inside Reinforcement Cloth, Outside Reinforcement Cloth

As illustrated in FIG. 2, in the present exemplary embodiment, the seat width direction inner side of the airbag module 20 is covered by the inside reinforcement cloth 50 and the seat width direction outer side of the airbag module 20 is covered by the outside reinforcement cloth 52 so as to wrap the airbag module 20 from the outside.

Namely, in the present exemplary embodiment, the inside reinforcement cloth 50 is provided between the airbag module 20 and the side frame 18. Note that the inside reinforcement cloth 50 and the outside reinforcement cloth 52 are formed in belt shapes using fabric, resin sheets or the like that stretch less readily than the inside cover 44 and the outside cover 46.

As illustrated in FIG. 2 and FIG. 4, one seat front-rear direction end portion 50A of the inside reinforcement cloth 50 (referred to hereafter simply as the "one end portion 50A of the inside reinforcement cloth 50") is fixed to the rear side wall 18C of the side frame 18 (this will be described later). Another seat front-rear direction end portion 50B of the inside reinforcement cloth 50 (referred to hereafter simply as the "other end portion 50B of the inside reinforcement cloth 50") is folded back on itself and joined to the one end portion 44A of the inside cover 44 (configuring a join portion 54).

One seat front-rear direction end portion 52A of the outside reinforcement cloth 52 (referred to hereafter simply as the "one end portion 52A of the outside reinforcement cloth 52") is also fixed to the rear side wall 18C of the side frame 18 (this will be described later). Another seat front-rear direction end portion 52B of the outside reinforcement cloth 52 (referred to hereafter simply as the "other end portion 52B of the outside reinforcement cloth 52") is folded back on itself and joined to the one end portion 46A of the outside cover 46 (configuring a join portion 56).

The inside reinforcement cloth 50 and the inside cover 44 are joined together at the join portion 54, and the outside reinforcement cloth 52 and the outside cover 46 are joined together at the join portion 56. In this state, the inside reinforcement cloth 50, the inside cover 44, the outside cover 46, and the outside reinforcement cloth 52 are joined together at the join portion 48.

Note that as described above, the inside reinforcement cloth 50 is provided between the airbag module 20 and the side frame 18. More specifically, the inside reinforcement cloth 50 is provided between the inside face 30A of the airbag module 20 and the outside wall 18A of the side frame 18.

The side frame 18 and the airbag module 20 are disposed further toward the seat front-rear direction rear side than the corresponding pad side portion 24B. In other words, the pad side portion 24B is disposed at the seat front-rear direction front side of the airbag module 20.

Accordingly, the inside reinforcement cloth 50 is joined to the outside reinforcement cloth 52 and the like in a state in which the inside reinforcement cloth 50 has been fixed to the rear side wall 18C of the side frame 18, provided between the outside wall 18A of the side frame 18 and the housing case 30 of the airbag module 20, passed between a front face 30B of the housing case 30 and a rear face 24B3 of the pad side portion 24B, made to run around the outer face 24B2 of the pad side portion 24B, and folded back on itself at the join portion 48.

On the other hand, the outside reinforcement cloth 52 joined to the inside reinforcement cloth 50 and the like in a state in which the outside reinforcement cloth 52 has been fixed to the rear side wall 18C of the side frame 18, made to run around an outside face 30C of the housing case 30 of the airbag module 20, passed the outer face 24B2 side of the pad side portion 24B, and folded back on itself at the join portion 48.

An escape path 58 through which the side airbag escapes into the vehicle cabin interior 35 during deployment of the side airbag is provided between the inside reinforcement cloth 50 and the outside reinforcement cloth 52. The join portion 48 configures an exit point of the escape path 58.

Accordingly, on actuation of the inflator 32 of the airbag module 20, gas is supplied into the side airbag, causing the side airbag to inflate toward the escape path 58. As the side airbag inflates, the inside reinforcement cloth 50 and the outside reinforcement cloth 52 are stretched as a result of inflation pressure from the side airbag, causing a concentration of stress on the other end portion 50B of the inside reinforcement cloth 50 and the other end portion 52B of the outside reinforcement cloth 52.

The join portion 48 where the inside cover 44 and the outside cover 46 as well as the inside reinforcement cloth 50 and the outside reinforcement cloth 52 are stitched together accordingly splits open, and the side airbag deploys toward the seat front-rear direction front side of the seatback side portion 14B through the exit point of the escape path 58. Namely, the side airbag is deployed between the occupant sitting on the vehicle seat 10 and the corresponding non-illustrated vehicle side door.

Side Frame, Inside Reinforcement Cloth

In the present exemplary embodiment, as illustrated in FIG. 2, an anchor tab 31 juts out from a leading end of the rear side wall 18C of the side frame 18 toward the seat front-rear direction front side and the seat width direction inner side. The anchor tab 31 has a length that enables J-hooks 62 or the like, described later, to be anchored thereto.

Figure 5:
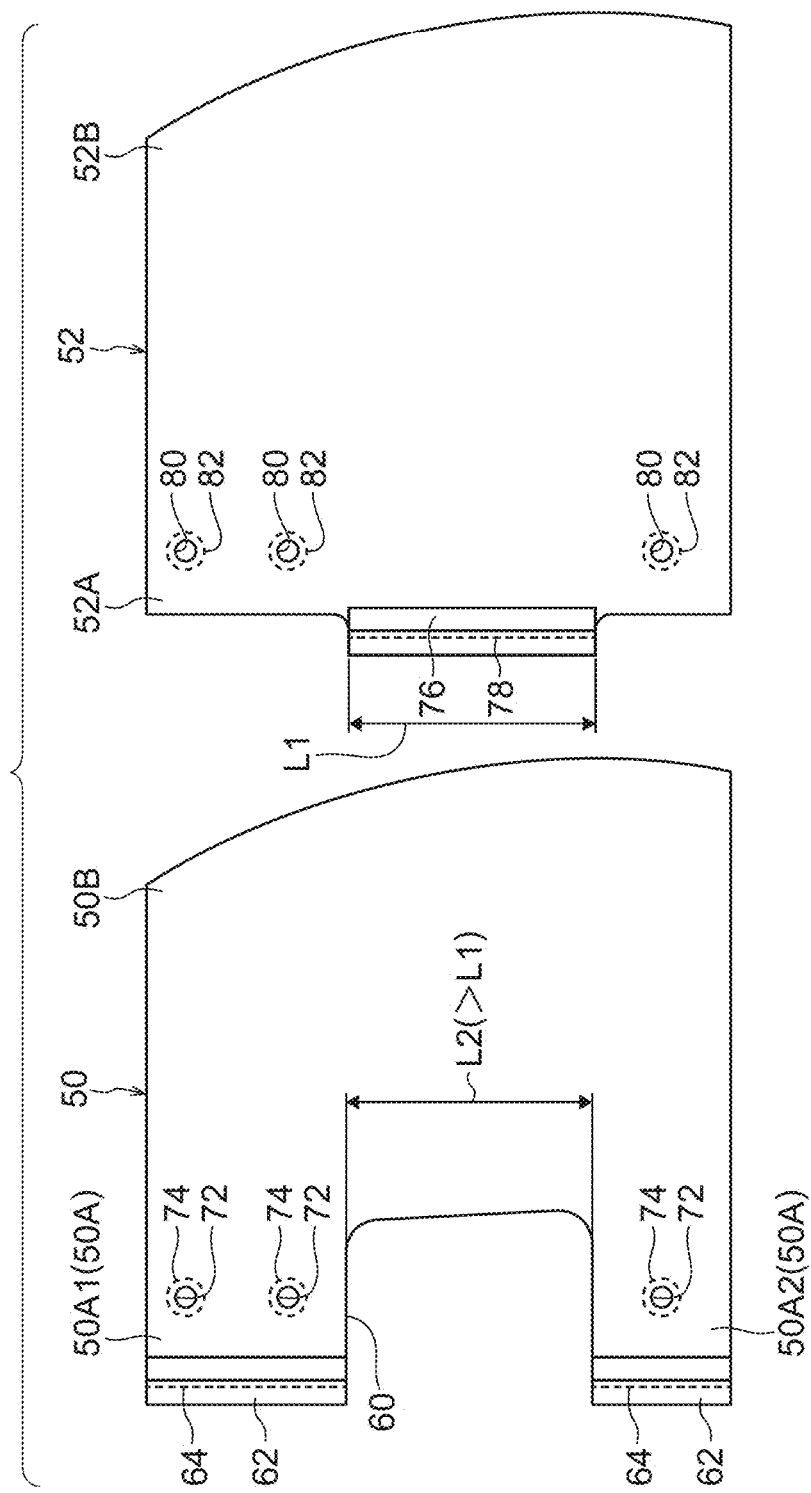
FIG. 5 is a plan view illustrating an inside reinforcement cloth and an outside reinforcement cloth applied to a vehicle seat according to an exemplary embodiment.

FIG. 5 is a plan view illustrating the inside reinforcement cloth 50 and the outside reinforcement cloth 52. As illustrated in FIG. 5, a seat up-down direction central portion of the one end portion 50A of the inside reinforcement cloth 50 is formed with a substantially C-shaped notch 60 opening toward the one seat width direction end side.

As illustrated in FIG. 2 and FIG. 3, the notch 60 is set with a dimension that does not overlap with the attachment mount 18A3 for the inflator 32 that is provided to the outside wall 18A of the side frame 18. The one end portion 50A side of the inside reinforcement cloth 50 is formed with a two-pronged profile including an upper part 50A1 and a lower part 50A2 that are separated into seat upper and lower sides by the notch 60.

As described previously, in a state in which the airbag module 20 has been fixed to the side frame 18, the inside face 30A of the housing case 30 abuts the attachment mount 18A3 of the side frame 18, while the gap 43 is formed between the inside face 30A of the housing case 30 and the upper side recess 18A4 of the side frame 18 at the upper side of the attachment mount 18A3. Moreover, the gap 47 is formed between the inside face 30A of the housing case 30 and the lower side recess 18A5 of the side frame 18 at the lower side of the attachment mount 18A3.

Accordingly, even in the state in which the airbag module 20 has been fixed to the side frame 18, the upper part 50A1 of the inside reinforcement cloth 50 can be inserted into the gap 43 on the upper side recess 18A4 side of the side frame 18, and the lower part 50A2 of the inside reinforcement cloth 50 can be inserted into the gap 47 on the lower side recess 18A5 side of the side frame 18.

Figure 6:
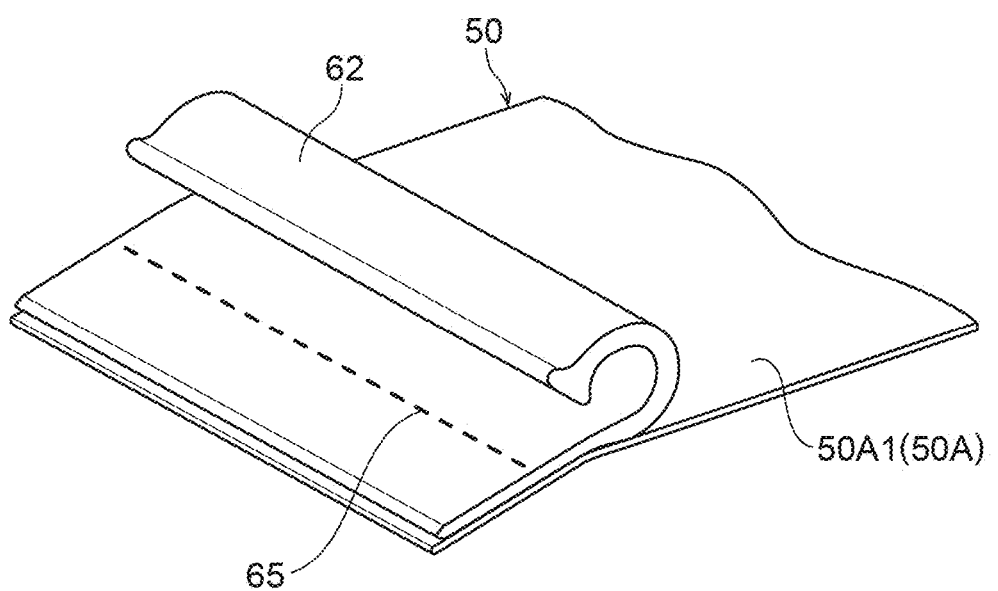
FIG. 6 is a perspective view illustrating a state in which a J-hook has been attached to an inside reinforcement cloth applied to a vehicle seat according to an exemplary embodiment.

As illustrated in FIG. 5 and FIG. 6, for example, the J-hooks 62 are joined by welding or the like to respective leading end portions of the upper part 50A1 and the lower part 50A2 on the one end portion 50A side of the inside reinforcement cloth 50 (configuring weld portions 65).

As illustrated in FIG. 1 and FIG. 2, the J-hooks 62 are capable of being anchored to the anchor tab 31. By anchoring the J-hooks 62 of the upper part 50A1 and the lower part 50A2 to the anchor tab 31, the one end portion 50A of the inside reinforcement cloth 50 is provisionally held with respect to the rear side wall 18C of the side frame 18.

Figure 7:
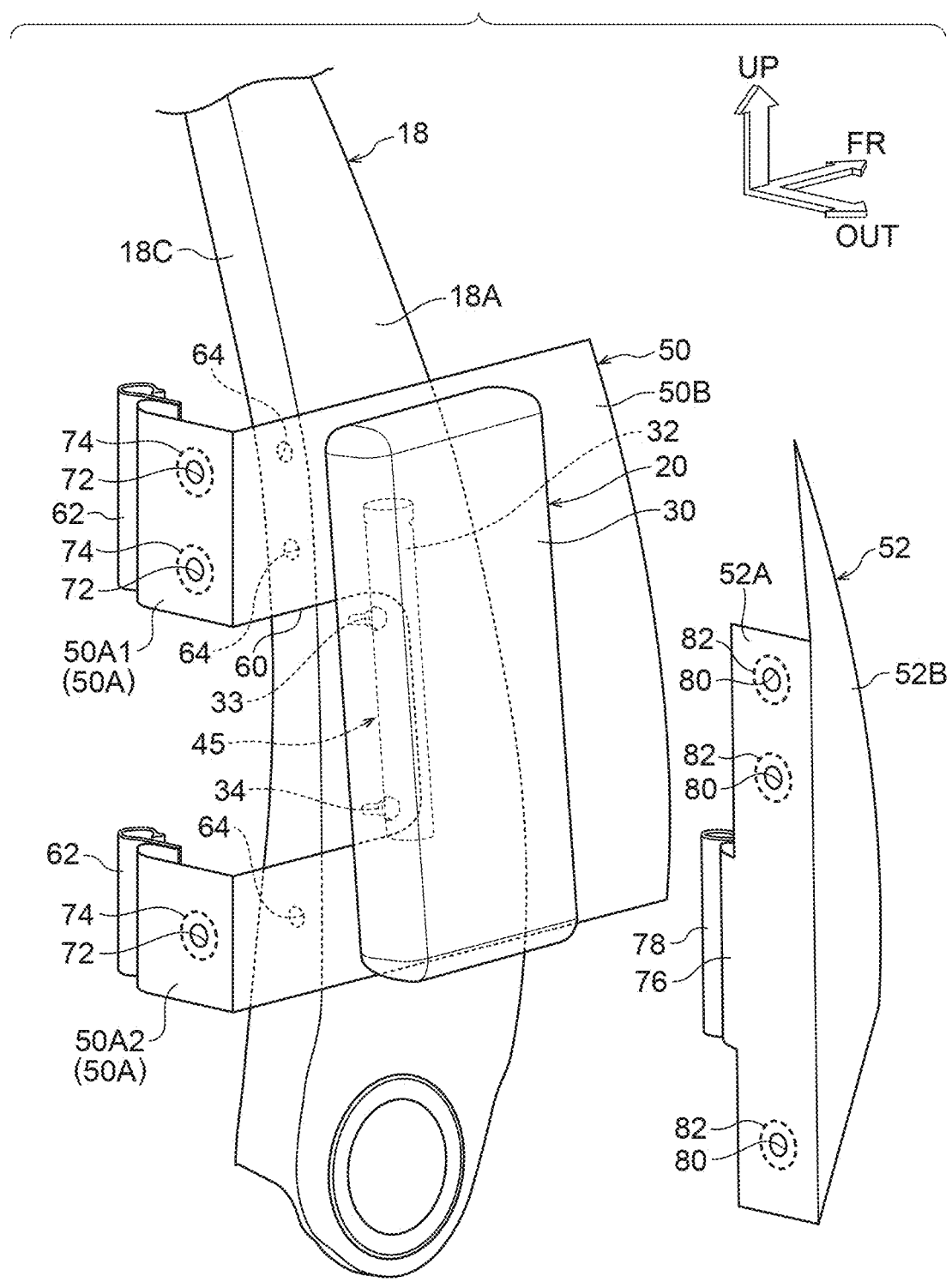
FIG. 7 is an enlarged perspective view illustrating relevant portions from FIG. 1.

FIG. 7 is a perspective view illustrating relevant portions of FIG. 1 in an enlarged state. As illustrated in FIG. 1 and FIG. 7, the rear side wall 18C of the side frame 18 is formed with plural fixing holes 64 arrayed in the seat up-down direction to allow insertion of resin clips 66 into the respective fixing holes 64.

As illustrated in FIG. 2, each of the clips 66 is configured including a circular plate shaped head 68, and a neck 70 provided with a thread 70A. In a state in which the neck 70 has been inserted into the corresponding fixing hole 64, the thread 70A is anchored to and held in the fixing hole 64.

Each of the clips 66 is fixed to the rear side wall 18C of the side frame 18 in a state in which the head 68 thereof is abutting the periphery of the corresponding fixing hole 64. In the following explanation, reference is made simply to the clips 66, without distinguishing between the heads 68 and the necks 70 of the clips 66.

As illustrated in FIG. 7, the one end portion 50A of the inside reinforcement cloth 50 is formed with fixing holes 72 corresponding to the fixing holes 64. In the present exemplary embodiment, the upper part 50A1 of the one end portion 50A of the inside reinforcement cloth 50 is formed slightly longer in the seat up-down direction than the lower part 50A2.

Thus, the fixing holes 72 are provided at two locations arrayed in the seat up-down direction on the upper part 50A1, and at a single location on the lower part 50A2. Note that the upper part 50A1 and the lower part 50A2 may be configured with substantially the same length as each other in the seat up-down direction, in which case the fixing holes 72 may be provided at two locations on both the upper part 50A1 and the lower part 50A2. However, in consideration of the ease of attaching the inside reinforcement cloth 50, it is preferable for the clips 66 to be provided at fewer locations.

Tension is transmitted to the inside reinforcement cloth 50 during inflation and deployment of the side airbag. Accordingly, as an example, in the present exemplary embodiment, circles are stitched into the inside reinforcement cloth 50 concentrically to the fixing holes 72 so as to form reinforcement portions 74 that provide peripheral reinforcement to the fixing holes 72.

Side Frame, Outside Reinforcement Cloth

As illustrated in FIG. 5, a rectangular grip portion 76 that is grippable by a technician projects in the seat front-rear direction from a seat up-down direction central portion of the one end portion 52A of the outside reinforcement cloth 52. A seat up-down direction dimension L1 of the grip portion 76 is set slightly smaller than a seat up-down direction dimension L2 of the notch 60 in the inside reinforcement cloth 50. The grip portion 76 is set so as to be disposed inside the notch 60 in the inside reinforcement cloth 50 in a state in which the one end portion 52A of the outside reinforcement cloth 52 has been superimposed on the one end portion 50A of the inside reinforcement cloth 50.

A J-hook 78 is provided to the grip portion 76 on the one end portion 52A side of the outside reinforcement cloth 52. The one end portion 52A of the outside reinforcement cloth 52 is provisionally held with respect to the rear side wall 18C of the side frame 18 by anchoring the J-hook 78 to the anchor tab 31 of the side frame 18 illustrated in FIG. 2.

Namely, in the present exemplary embodiment, as illustrated in FIG. 2 and FIG. 7, the J-hooks 62 provided to the upper part 50A1 and the lower part 50A2 on the one end portion 50A side of the inside reinforcement cloth 50 are each anchored to the anchor tab 31 of the side frame 18, and the J-hook 78 provided to the grip portion 76 on the one end portion 52A side of the outside reinforcement cloth 52 is anchored to the anchor tab 31 of the side frame 18.

As described above, the grip portion 76 is set so as to be disposed inside the notch 60 in the inside reinforcement cloth 50 in a state in which the one end portion 52A of the outside reinforcement cloth 52 has been superimposed on the one end portion 50A of the inside reinforcement cloth 50. Accordingly, in the present exemplary embodiment, in a state in which the J-hooks 62 provided to the upper part 50A1 and the lower part 50A2 of the inside reinforcement cloth 50 have been anchored to the anchor tab 31 of the side frame 18, the grip portion 76 is disposed between the upper part 50A1 and the lower part 50A2 such that the J-hooks 62 and the J-hook 78 are disposed arrayed in the seat up-down direction at positions that do not interfere with each other.

Similarly to the inside reinforcement cloth 50, the one end portion 52A of the outside reinforcement cloth 52 is formed with fixing holes 80 to allow insertion of the clips 66 at positions corresponding to the fixing holes 64 formed in the rear side wall 18C of the side frame 18. During inflation and deployment of the side airbag, tension is transmitted to the outside reinforcement cloth 52 similarly to in the case of the inside reinforcement cloth 50. Accordingly, as an example, in the present exemplary embodiment, circles are stitched into the outside reinforcement cloth 52 concentrically to the fixing holes 80 so as to form reinforcement portions 82 that provide peripheral reinforcement to the fixing holes 80.

The fixing holes 80 in the outside reinforcement cloth 52, the fixing holes 72 in the inside reinforcement cloth 50, and the fixing holes 64 in the rear side wall 18C of the side frame 18 are set so as to overlap with each other in a state in which the J-hooks 62 on the inside reinforcement cloth 50 side have been anchored to the anchor tab 31, and the J-hook 78 on the outside reinforcement cloth 52 side has been anchored to the anchor tab 31.

In a state in which the respective fixing holes 80, 72, 64 are overlapping each other, the clips 66 are inserted into the fixing holes 80, 72, 64, and the clips 66 are then fixed to the rear side wall 18C of the side frame 18 so as to fix the one end portion 50A of the inside reinforcement cloth 50 and the one end portion 52A of the outside reinforcement cloth 52 to the rear side wall 18C of the side frame 18.

Operation and Advantageous Effects of Vehicle Seat

Next, explanation follows regarding operation and advantageous effects of the vehicle seat according to the present exemplary embodiment.

As illustrated in FIG. 1 and FIG. 2, in the present exemplary embodiment, the front face 24B1 of the pad side portion 24B of the pad front portion 24 is covered by the inside cover 44 and the outer face 24B2 of the pad side portion 24B is covered by the outside cover 46 at the seatback side portion 14B positioned on the seat width direction outer side of the seatback 14. The one end portion 44A of the inside cover 44 and the one end portion 46A of the outside cover 46 are joined together at the join portion 48.

Out of the left and right seatback side portions 14B, the airbag module 20 is housed inside the seatback side portion 14B positioned on the vehicle width direction outer side. The airbag module 20 includes the non-illustrated side airbag configured to inflate and deploy toward the join portion 48 on receiving a supply of gas. The seatback side portion 14B is further provided with the side frame 18, and the airbag module 20 is fixed to this side frame 18.

The seat width direction outer side of the airbag module 20 is covered by the outside reinforcement cloth 52, and the one end portion 52A of the outside reinforcement cloth 52 is fixed to the side frame 18, while the other end portion 52B of the outside reinforcement cloth 52 is joined to the outside cover 46 at the join portion 48 where the inside cover 44 and the outside cover 46 are joined together.

The inside reinforcement cloth 50 is disposed between the side frame 18 and the airbag module 20, such that the seat width direction inner side of the airbag module 20 is covered by the inside reinforcement cloth 50. The one end portion 50A of the inside reinforcement cloth 50 is separated into seat upper and lower sides, and is fixed to the side frame 18 in a manner that avoids the fixing portion 45 where the airbag module 20 is fixed to the side frame 18. The other end portion 50B of the inside reinforcement cloth 50 is joined to the inside cover 44 at the join portion 48.

Due to the above configuration, in the present exemplary embodiment, when the side airbag inflates and deploys on receiving a supply of gas, the outside reinforcement cloth 52 and the inside reinforcement cloth 50 are stretched under inflation pressure from the side airbag such that tension is transmitted to the join portion 48 between the inside cover 44 to which the inside reinforcement cloth 50 is joined and the outside cover 46 to which the outside reinforcement cloth 52 is joined.

Accordingly, tensile stress concentrates at the join portion 48, causing the join portion 48 to split open such that the side airbag inflates and deploys toward the seat front-rear direction front side of the vehicle seat 10 (into the vehicle cabin interior 35).

Note that in the present exemplary embodiment, the airbag module 20 is covered by the outside reinforcement cloth 52 and the inside reinforcement cloth 50. Accordingly, although not illustrated in the drawings, inflation of the side airbag inside the seatback side portion 14B can be suppressed in comparison to cases in which, for example, a shock-absorbent member such as a pad is provided between the outside reinforcement cloth 52 and the inside reinforcement cloth 50.

Namely, in the present exemplary embodiment, during inflation and deployment of the side airbag, the side airbag is suppressed from inflating inside the seatback side portion 14B, enabling wasted deployment potential of the side airbag to be reduced, and enabling the ability of the side airbag to split open the join portion 48 to be improved.

Moreover, in the present exemplary embodiment, the inside reinforcement cloth 50 is disposed between the side frame 18 and the airbag module 20. Accordingly, during inflation and deployment of the side airbag, the side frame 18 suppresses the side airbag from inflating toward the seat width direction inner side inside the seatback side portion 14B, enabling wasted deployment potential of the side airbag to be reduced, and enabling the speed with which the side airbag splits open the join portion 48 to be increased.

As described above, in the present exemplary embodiment, the one end portion 50A of the inside reinforcement cloth 50 is separated into seat upper and lower sides and fixed to the side frame 18 in a manner that avoids the fixing portion 45 of the airbag module 20. This enables the inside reinforcement cloth 50 to be fixed to the side frame 18 after the airbag module 20 has been fixed to the side frame 18.

Namely, in the present exemplary embodiment, the inside reinforcement cloth 50 can be fixed to the side frame 18 before fixing the airbag module 20 to the side frame 18, and the inside reinforcement cloth 50 can also be fixed to the side frame 18 after the airbag module 20 has been fixed to the side frame 18.

Accordingly, in the present exemplary embodiment, the inside reinforcement cloth 50 and the outside reinforcement cloth 52 can be attached even after the airbag module 20 has been fixed to the side frame 18, thus enabling the ease of attachment to be improved.

More specific explanation follows regarding the manner in which the one end portion 50A of the inside reinforcement cloth 50 is separated into seat upper and lower sides so as to avoid the fixing portion 45 of the airbag module 20. In the present exemplary embodiment, as illustrated in FIG. 5, the notch 60 is formed in the one end portion 50A of the inside reinforcement cloth 50, such that the one end portion 50A of the inside reinforcement cloth 50 is formed with a two-pronged profile including the upper part 50A1 and the lower part 50A2 by the notch 60. The notch 60 is set with a dimension so as not to overlap with the attachment mount 18A3 for the inflator 32, illustrated in FIG. 3. The one end portion 50A of the inside reinforcement cloth 50 is thus able to avoid the fixing portion 45 (see FIG. 1) where the airbag module 20 is fixed to the side frame 18.

Moreover, as illustrated in FIG. 3, the side frame 18 is provided with the upper side recess 18A4 at the upper side of the attachment mount 18A3, and the lower side recess 18A5 at the lower side of the attachment mount 18A3. The upper side recess 18A4 and the lower side recess 18A5 are set such that, in a state in which the airbag module 20 has been fixed to the side frame 18, the gaps 43, 47 between the side frame 18 and the airbag module 20 are formed with at least the thickness of the inside reinforcement cloth 50.

In this manner, even in a state in which the airbag module 20 has been fixed to the side frame 18, the upper part 50A1 of the inside reinforcement cloth 50 can be inserted into the gap 43 on the upper side recess 18A4 side of the side frame 18, and the lower part 50A2 of the inside reinforcement cloth 50 can be inserted into the gap 47 on the lower side recess 18A5 side of the side frame 18.

Due to the above configuration, the present exemplary embodiment enables the inside reinforcement cloth 50 to be disposed between the side frame 18 and the airbag module 20 in a state in which the airbag module 20 has been fixed to the side frame 18.

Moreover, as illustrated in FIG. 5, in the present exemplary embodiment, the grippable grip portion 76 is provided to the one end portion 52A of the outside reinforcement cloth 52. The grip portion 76 is set so as to be disposed inside the notch 60 in the inside reinforcement cloth 50 in a state in which the one end portion 52A of the outside reinforcement cloth 52 has been superimposed on the one end portion 50A of the inside reinforcement cloth 50.

Accordingly, as illustrated in FIG. 7, the seat up-down direction positional relationships of the inside reinforcement cloth 50 and the outside reinforcement cloth 52 with respect to the side frame 18 are easier to ascertain. This enables the ease with which an operation to fix the inside reinforcement cloth 50 and the outside reinforcement cloth 52 to the side frame 18 can be performed to be improved as a result.

Moreover, as illustrated in FIG. 1, in the present exemplary embodiment, the one end portion 52A of the outside reinforcement cloth 52 and the one end portion 50A of the inside reinforcement cloth 50 are jointly fixed to the side frame 18 using the resin clips 66.

The present exemplary embodiment thereby facilitates the attachment operation, enabling a reduction in costs and also enabling a reduction in weight in comparison to a non-illustrated example in which the outside reinforcement cloth 52 and the inside reinforcement cloth 50 are fixed to the side frame 18 using metal nuts and bolts.

In the present exemplary embodiment, the one end portion 50A of the inside reinforcement cloth 50 and the one end portion 52A of the outside reinforcement cloth 52 are respectively provided with the J-hooks 62, 78. The J-hooks 62, 78 are capable of being anchored to the anchor tab 31 of the side frame 18 (see FIG. 2).

Providing the respective J-hooks 62, 78 to the inside reinforcement cloth 50 and the outside reinforcement cloth 52 in this manner enables the inside reinforcement cloth 50 and the outside reinforcement cloth 52 to be provisionally held by anchoring the respective J-hooks 62, 78 to the side frame 18 during fixing of the inside reinforcement cloth 50 and the outside reinforcement cloth 52 to the side frame 18. The present exemplary embodiment thus enables ease of operation to be improved.

Moreover, anchoring the J-hooks 62, 78 to the side frame 18 enables shear force acting on the clips 66 to be dispersed when tension is transmitted to the inside reinforcement cloth 50 and the outside reinforcement cloth 52 during inflation and deployment of the side airbag.

Supplementary Explanation Regarding Present Exemplary Embodiment

Next, explanation follows regarding modified examples of the vehicle seat according to the exemplary embodiment described above.

Inside Reinforcement Cloth, Outside Reinforcement Cloth

In the exemplary embodiment described above, as illustrated in FIG. 7, the reinforcement portions 74 are provided in concentric circles around the fixing holes 72 formed in the inside reinforcement cloth 50, and the reinforcement portions 82 are provided in concentric circles around the fixing holes 80 formed in the outside reinforcement cloth 52.

However, since it is sufficient that the inside reinforcement cloth 50 and the outside reinforcement cloth 52 are prevented from tearing at the fixing holes 72, 80 when tension is transmitted to the inside reinforcement cloth 50 and the outside reinforcement cloth 52 during inflation and deployment of the side airbag, there is no limitation thereto.

Figure 8:
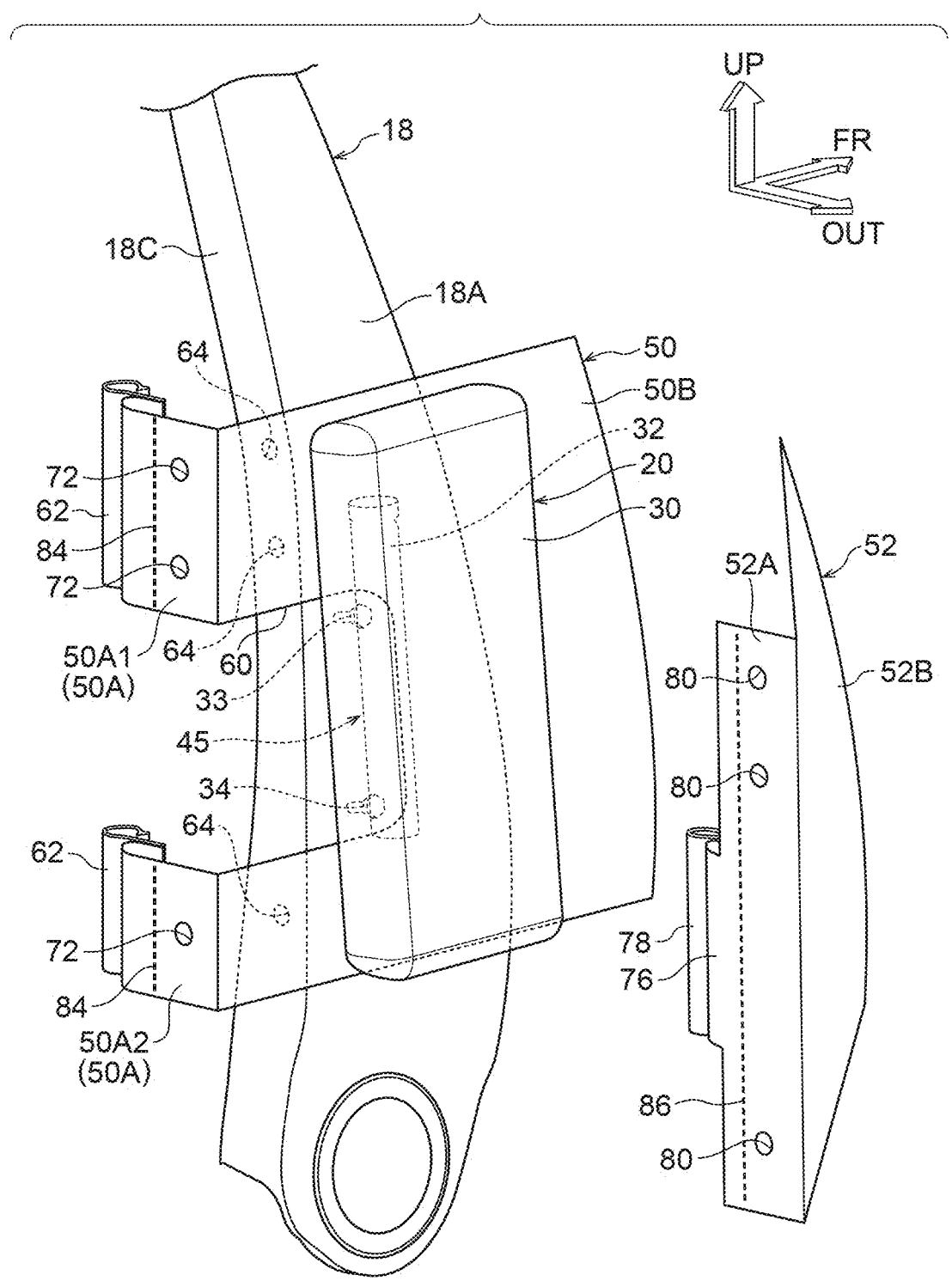
FIG. 8 is an enlarged perspective view corresponding to FIG. 7, illustrating relevant portions of a first modified example of an inside reinforcement cloth and an outside reinforcement cloth applied to a vehicle seat according to an exemplary embodiment.

For example, as in a first modified example illustrated in FIG. 8, respective stitched portions 84 may be provided on the J-hook 62 side of the fixing holes 72 so as to span the entire seat up-down direction ranges of the upper part 50A1 and the lower part 50A2 of the inside reinforcement cloth 50. Moreover, a stitched portion 86 may be provided on the J-hook 78 side of the fixing holes 80 so as to span the entire seat up-down direction range of the one end portion 52A of the outside reinforcement cloth 52.

In the exemplary embodiment described above, as illustrated in FIG. 7 and FIG. 8, the one end portion 50A of the inside reinforcement cloth 50 and the one end portion 52A of the outside reinforcement cloth 52 are provided with the respective J-hooks 62, 78. However, if there is no need for the J-hooks 62, 78 to be provisionally held with respect to the side frame 18, the J-hooks 62, 78 may be omitted.

Figure 9:
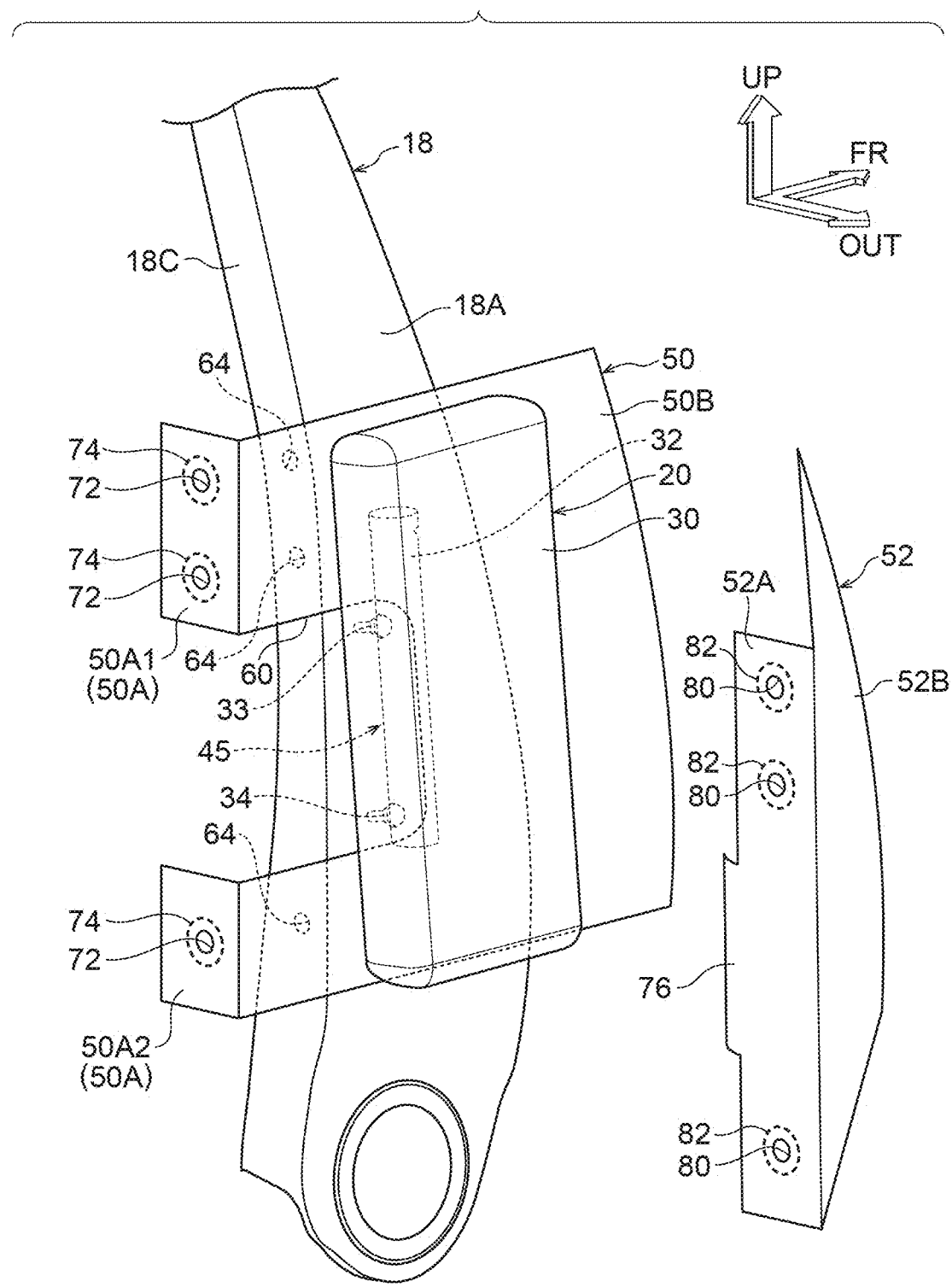
FIG. 9 is an enlarged perspective view corresponding to FIG. 7, illustrating relevant portions of a second modified example of an inside reinforcement cloth and an outside reinforcement cloth applied to a vehicle seat according to an exemplary embodiment.
Figure 10:
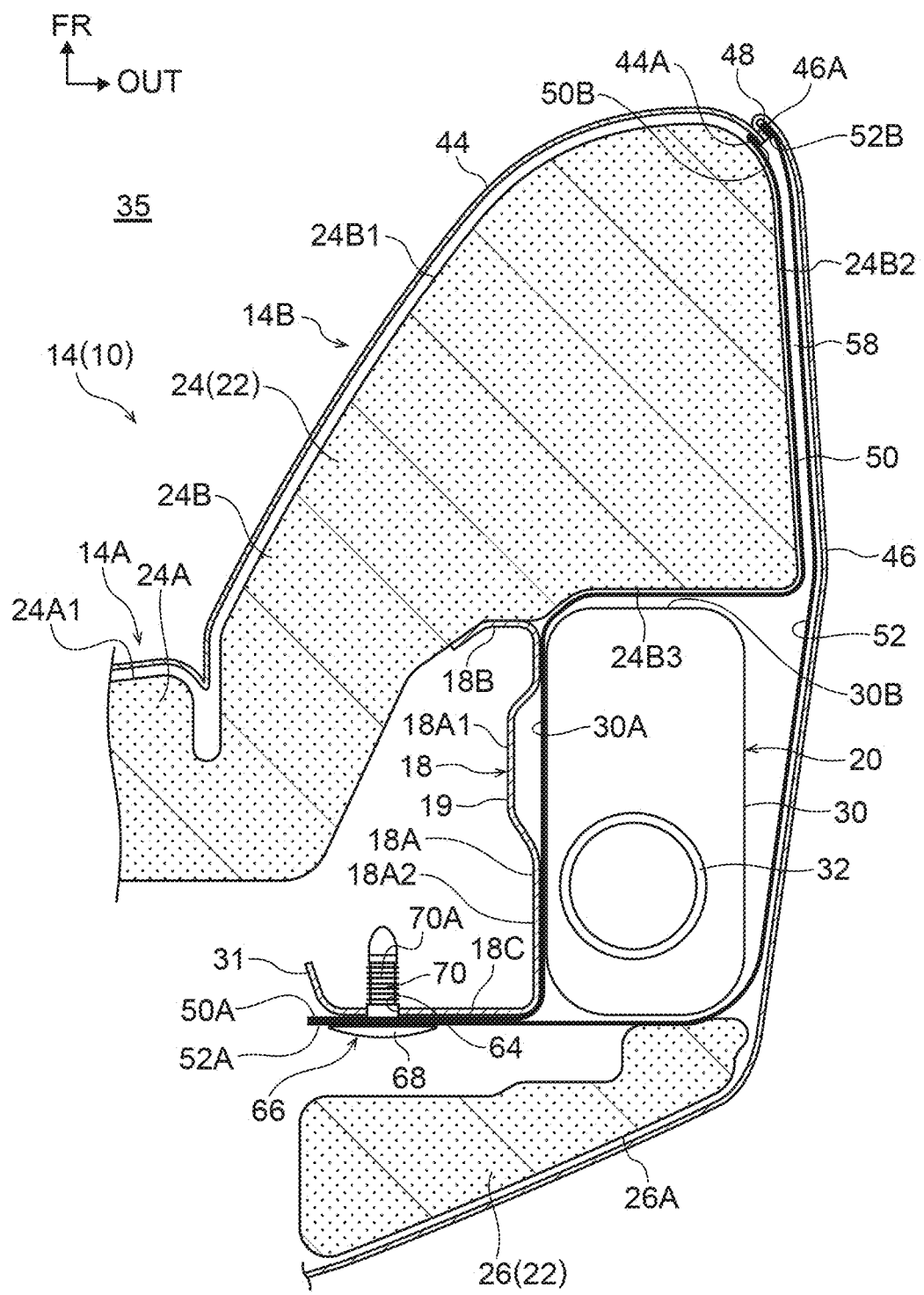
FIG. 10 is a cross-section corresponding to FIG. 2, illustrating a modified example of a side frame applied to a vehicle seat according to an exemplary embodiment.

In cases in which the J-hooks 62, 78 are not provided, as in a second modified example illustrated in FIG. 9, the reinforcement portions 74 are provided in concentric circles around the fixing holes 72 in the upper part 50A1 and the lower part 50A2 of the inside reinforcement cloth 50, and the reinforcement portions 82 are provided in concentric circles around the fixing holes 80 in the outside reinforcement cloth 52. Moreover, in cases in which the J-hooks 62, 78 (see FIG. 7) are not provided, the anchor tab 31 illustrated in FIG. 10 does not have to be formed to the rear side wall 18C of the side frame 18.

Figure 11:
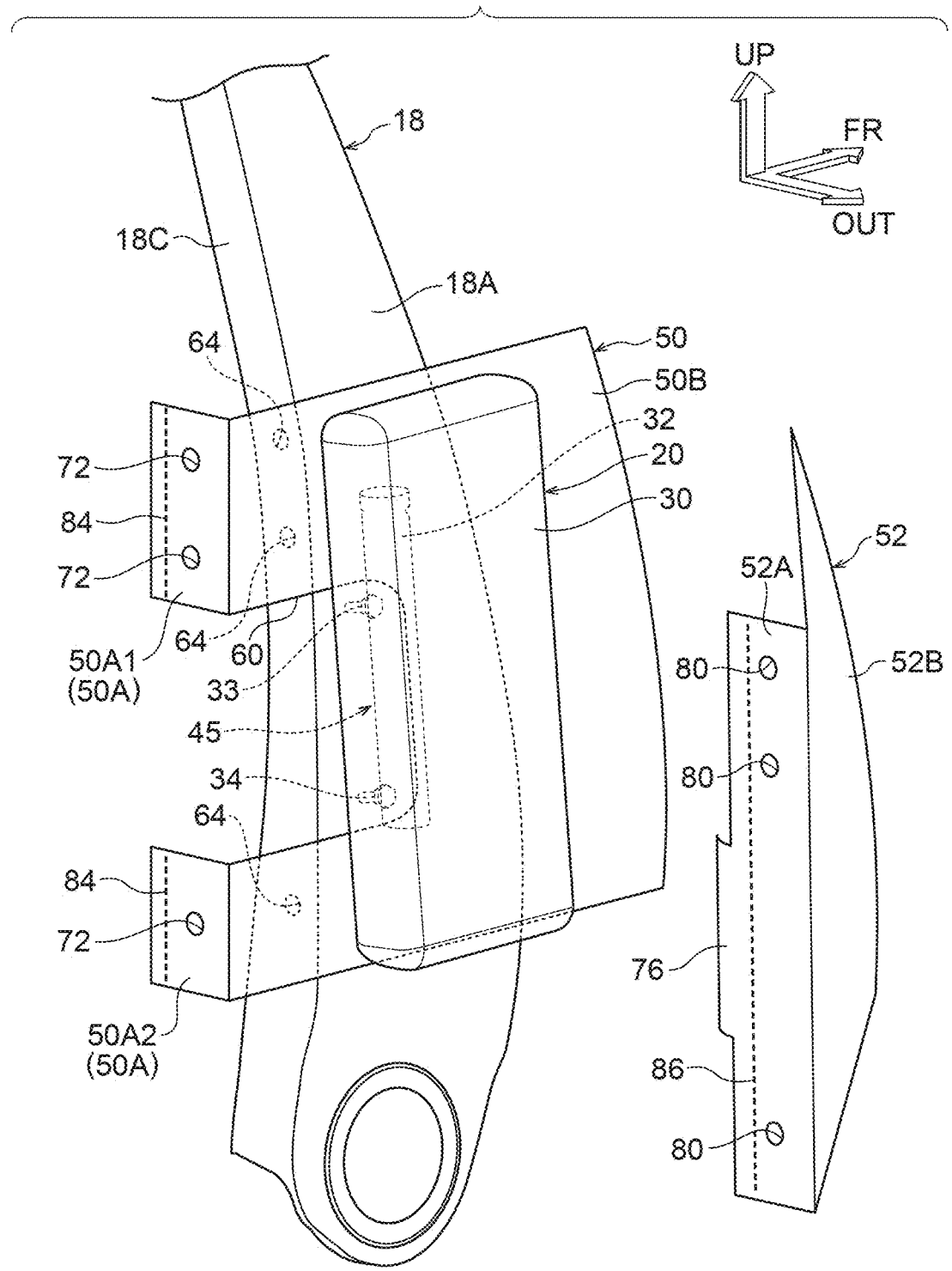
FIG. 11 is an enlarged perspective view corresponding to FIG. 7, illustrating relevant portions of a third modified example of an inside reinforcement cloth and an outside reinforcement cloth applied to a vehicle seat according to an exemplary embodiment.

Instead of the configuration illustrated in FIG. 9, as in a third modified example illustrated in FIG. 11, stitched portions 84 may be provided at a leading end side of the respective fixing holes 72 so as to span the entire seat up-down direction ranges of the upper part 50A1 and the lower part 50A2 of the inside reinforcement cloth 50. Moreover, a stitched portion 86 may be provided at a leading end side of the fixing holes 80 so as to span the entire seat up-down direction range of the one end portion 52A of the outside reinforcement cloth 52. Note that the reinforcement portions 74, 82 illustrated in FIG. 7 and the stitched portions 84, 86 illustrated in FIG. 8 may be omitted in cases in which, for example, the strength at the peripheries of the fixing holes 72, 80 is already sufficient.

Seatback Side Frame

In the exemplary embodiment described above, as illustrated in FIG. 3, the attachment mount 18A3 that is abutted by the inside face 30A of the housing case 30 of the airbag module 20 in a state in which the airbag module 20 has been fixed to the side frame 18 is formed projecting toward the seat width direction outer side.

Accordingly, in a state in which the inside face 30A of the housing case 30 is abutting the attachment mount 18A3 of the side frame 18, the gap 43 is formed between the inside face 30A of the housing case 30 and the upper side recess 18A4 of the side frame 18, and the gap 47 is formed between the inside face 30A of the housing case 30 and the lower side recess 18A5 of the side frame 18. Accordingly, the present exemplary embodiment enables the upper part 50A1 of the inside reinforcement cloth 50 to be inserted into the gap 43, and enables the lower part 50A2 of the inside reinforcement cloth 50 to be inserted into the gap 47.

Since it is sufficient to be able to insert the upper part 50A1 and the lower part 50A2 of the inside reinforcement cloth 50 between the inside face 30A of the housing case 30 and the side frame 18 in this manner, the present exemplary embodiment is not limited thereto. Namely, the inside face 30A of the housing case 30 does not have to abut the attachment mount 18A3 of the side frame 18.

Figure 12:
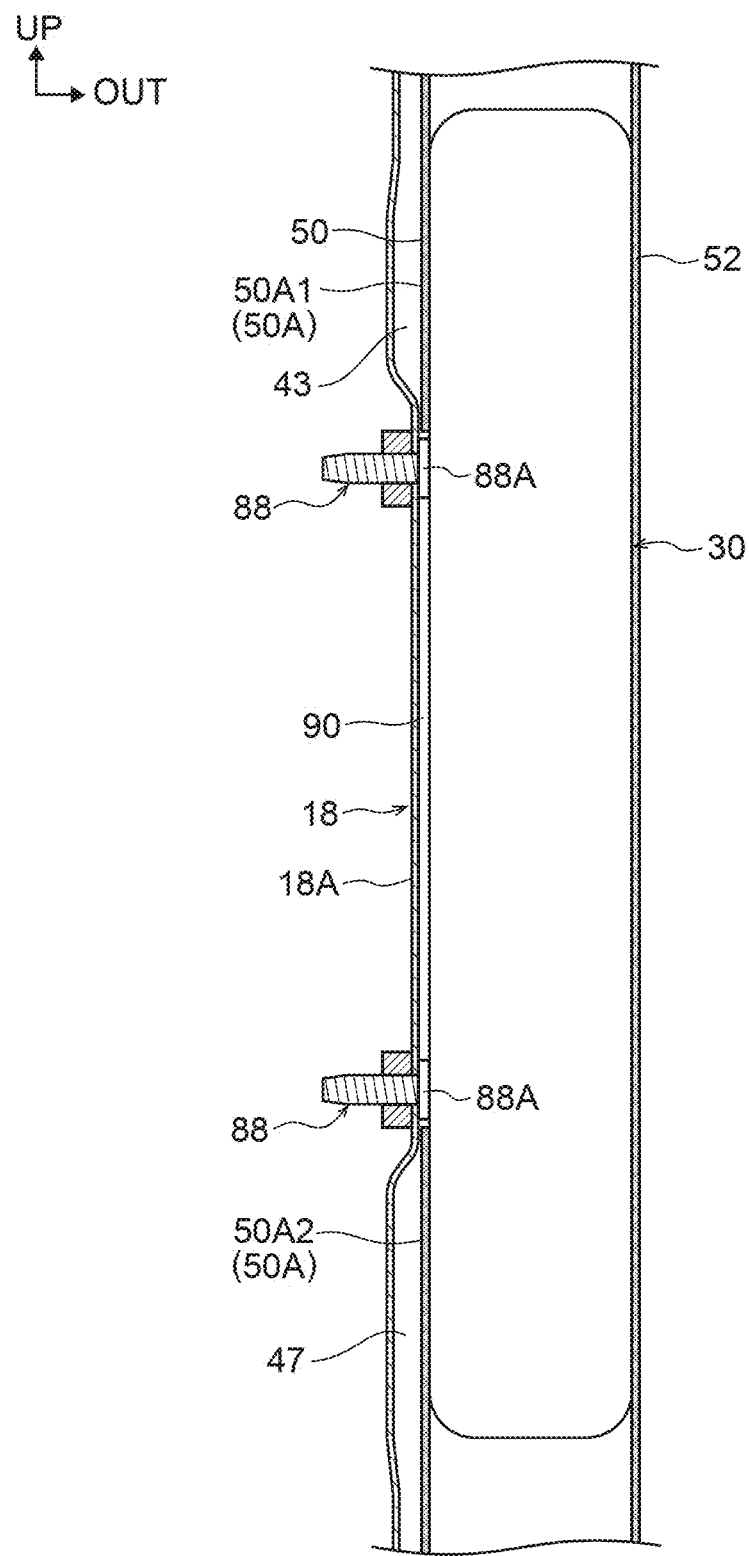
FIG. 12 is an enlarged cross-section corresponding to FIG. 3, illustrating relevant portions of a modified example of a side frame applied to a vehicle seat according to an exemplary embodiment.

As an example, FIG. 12 is an enlarged cross-section corresponding to FIG. 3, illustrating relevant portions of a modified example. As illustrated in FIG. 12, heads 88A of bolts 88 and washers (not illustrated in the drawings) or the like may be utilized to form a gap 90 between the inside face 30A of the housing case 30 and the attachment mount 18A3 of the side frame 18. This gap 90 may be utilized for insertion of the upper part 50A1 and the lower part 50A2 of the inside reinforcement cloth 50.

Although explanation has been given regarding an exemplary embodiment of the present disclosure, the present disclosure is not limited to such an exemplary embodiment. Obviously, the exemplary embodiment and various modified examples may be employed in combination, and various embodiments may be implemented within a range not departing from the spirit of the present disclosure.

What is claimed is:

1. A vehicle seat comprising:
   an outside cover that covers a seat width direction outer side surface of a seatback side section positioned on a seat width direction outer side of a seatback;
   an inside cover that covers a seat width direction inner side surface of the seatback side section and that includes one seat width direction end portion joined to one seat width direction end portion of the outside cover at a join portion;
   a side airbag module that is housed inside the seatback side section and that includes a side airbag configured to inflate and deploy toward the join portion on receiving a supply of gas;
   a side frame that extends in a seat up-down direction along the seatback side section with the side airbag module fixed to the side frame at a fixing portion;
   an outside reinforcement cloth that covers a seat width direction outer side of the side airbag module, that includes one seat front-rear direction end portion fixed to the side frame, that includes another seat front-rear direction end portion joined to the outside cover at the join portion, and that is configured to transmit tension to the join portion during inflation and deployment of the side airbag; and
   an inside reinforcement cloth that is disposed between the side frame and the side airbag module, that covers a seat width direction inner side of the side airbag module, that includes one seat front-rear direction end portion separated into seat upper and lower sides and fixed to the side frame in a manner that avoids the fixing portion, that includes another seat front-rear direction end portion joined to the inside cover at the join portion, and that is configured to transmit tension to the join portion during inflation and deployment of the side airbag.

2. The vehicle seat of claim 1, wherein the one seat front-rear direction end portion of the outside reinforcement cloth and the one seat front-rear direction end portion of the inside reinforcement cloth are jointly fixed to the side frame using a resin clip.

3. The vehicle seat of claim 1, wherein the side frame is provided with a recess forming a gap of at least a thickness of the inside reinforcement cloth between the side airbag module and the side frame in a state in which the side airbag module has been fixed to the side frame.

4. The vehicle seat of claim 1, further comprising:

a notch that is formed in the one seat front-rear direction end portion of the inside reinforcement cloth so as to avoid the fixing portion where the side airbag module is fixed to the side frame; and a grippable grip portion that is provided at the one seat front-rear direction end portion of the outside reinforcement cloth so as to be disposed inside the notch in a state in which the one seat front-rear direction end portion of the outside reinforcement cloth has been superimposed on the one seat front-rear direction end portion of the inside reinforcement cloth.

5. The vehicle seat of claim 1, wherein the one seat front-rear direction end portion of the inside reinforcement cloth and the one seat front-rear direction end portion of the outside reinforcement cloth are respectively provided with a hook capable of being anchored to the side frame.

6. The vehicle seat of claim 4, wherein the one end portion of the inside reinforcement cloth is formed with a two-pronged profile including an upper part and a lower part by the notch.

* * * * *